UNITED STATES PATENT OFFICE.

HALVOR HALVORSON, OF CAMBRIDGE, MASSACHUSETTS.

IMPROVED COMPOUND OF CYANOGEN AND IRON.

Specification forming part of Letters Patent No. 43,022, dated June 7, 1864.

*To all whom it may concern:*

Be it known that I, HALVOR HALVORSON, of Cambridge, in the county of Middlesex and State of Massachusetts, have invented a certain new and useful Compound of Cyanogen and Iron; and I do hereby declare that the following is a full, clear, and exact description of the manner of producing the same.

It is boasted that there is no class of organic bodies of which our knowledge is more extensive and exact than those having cyanogen as their basis; that the powerful affinities it exerts, the simplicity of its constitution, and our ability to prepare it and generate compounds directly from it renders its history the most advanced portion of organic chemistry; yet great discrepancies exist in the formula constructed on many of its compounds, and confusion reigns in the theories of their formation. That which immediately interests me, and which on this occasion claims my attention, is its combinations with iron. In regard to this it is assumed that true Prussian blue is Fe7Cy9, and consisting of 3FeCy+2FerCy3.

Before proceeding further, let us examine the manner of its formation. It is produced by mixing proper equivalents of protosulphate of iron (FeOSo3+7Ag) and yellow prussiate of potassium,(FeCy+2KCy+3Ag.) The result of the decomposition of these two salts is a white precipitate and a solution of sulphate of potash. This white precipitate is exposed to the air for the purpose of absorbing oxygen, and thus becomes blue. Now, what has become of this oxygen, to say nothing of the atom acknowledged to have been associated with the iron in the ferruginous sulphate that it should be excluded from the formula?

Again, admitting for argument's sake that iron and potassium exist in the metallic state, in combination with cyanogen in the yellow prussiate of potassium, what is claimed to be effected in metamorphosing this salt into the red prussiate through the intervention of chlorine but the oxidizement of the iron? And yet oxygen is excluded from the formula of its compounds with the protoxide of iron in the article known as "Turnbull's Prussian blue" without accounting for the oxygen combined with the iron. Would it not be more rational to form an equation representing the iron as a protoxide FeO undergoing the transmutation common to the protoxide becoming the compound FeO+Fe2O3?

Inasmuch as the peroxide of iron is capable of still another degree of oxidation, being in this respect isomeric with those of chromium and manganese, and this occurring under the influence of chlorine and in the presence of potassa in the formation of ferric acid (FeO3) in the ferrate of potassa, is it not in accordance with the nomenclature to assume that the potassa becomes the base for the ferric and cyanic acids and write its formula 2FeO3Cy3+3KO? The formula of these compounds become of more than ordinary interest in the case about to be presented, involving the production of a new Prussian blue of a beauty and depth of color unknown in other ferricyanogen compounds, whose formula is reconcilable only on the theory that the iron retains its oxygen in the compound.

If one atom of fused cyanide of potassium in concentrated aqueous solution be added to a similar solution of an atom of ferridcyanide of potassium, crystallization of a new salt immediately ensues in small, soft, pearly scales, which reacts upon a persalt of iron by the production of the intensely-deep Prussian blue above mentioned. But one will say that it is a reduction of the ferric to the ferro cyanide. How? The new salt is of course no longer the ferridcyanide of potassium, because its reaction on the persalt of iron is not that of the old salt; but neither is it a ferrocyanide, for, unlike that salt, the new salt strikes a permanent dark-green precipitate with the protosalts of iron.

It is to the first-named change my allusion in my specification of explosive compounds has reference, and to it I have applied the nomenclature of "cyanoferridcyanide of iron," and expressed the equation 2Fe2O3+2FeO3+7Cy.

Continuing experiments in a direction fraught with this phenomenon, I added an atom of cyanide of potassium to an atom of ferrocyanide of the same base, and, again, one-half an atom of sulphide and one-half atom of cyanide of potassium to one atom of ferridcyanide, all with a view, as may be inferred from my experiments on explosives, to infuse the largest possible amount of cyanogen and sulphur in combination into these explosive compounds; but the two latter experiments at combination are not of so evident utility as the first, although remarkably obvious in novelty through their reaction with copper, of which the cyanoferro, cyanoferri, and sulphocyano ferridcyanide compounds are exhibited.

Whatever of purely theoretical discussions may be indulged in regard to these new salts and their combinations as a dye or a pigment, the ferric cyanoferrid combination is one of great practical value and application. In the production of the pigment or its deposition on textile fabrics as a dye it is evident that slight changes in manipulation cannot detract from my discovery as it is obvious that a solution of ferridcyanide of potassium might be added to a solution of a persalt of iron, when the only phenomena occurring would be simply a change of color in the solution without a precipitate, which, however, would occur on the addition of the other atom of cyanide of potassium, and my result obtained, that existing solely in the additional atom of cyanide to the ordinary Prussian blue, irrespective of the formula I have given above.

What I claim as my invention, and desire to secure by Letters Patent, is—

The compound of cyanogen and iron herein set forth.

This specification signed this 11th day of March, 1864.

H. HALVORSON.

Witnesses:
   THOS. T. EVERETT,
   DANL. ROWLAND.